United States Patent [19]

Tung

[11] Patent Number: 5,238,630
[45] Date of Patent: Aug. 24, 1993

[54] IN-MOLD LABELING METHOD

[75] Inventor: Harvey C. Tung, Newark, Ohio

[73] Assignee: The Dow Chemical Company, Midland, Mich.

[21] Appl. No.: 985,735

[22] Filed: Dec. 4, 1992

Related U.S. Application Data

[63] Continuation of Ser. No. 485,333, Feb. 26, 1990, abandoned.

[51] Int. Cl.$^5$ .................. B29C 39/18; B29C 43/18
[52] U.S. Cl. .................. 264/132; 156/244.18; 264/157; 264/211; 264/509
[58] Field of Search .................. 264/129, 132, 211, 22, 264/157, 171, 509; 425/126.1, 289; 156/244.18

[56] References Cited

U.S. PATENT DOCUMENTS

| | | | |
|---|---|---|---|
| Re. 32,929 | 5/1989 | Ewing | 428/220 |
| 3,017,339 | 1/1962 | Dewey | 264/22 |
| 3,324,508 | 6/1967 | Dickinson | 264/509 |
| 3,367,999 | 2/1968 | Steiermann | 264/132 |
| 3,396,137 | 8/1968 | Wharton | 524/224 |
| 3,573,125 | 3/1971 | Elliott | 264/129 X |
| 3,809,671 | 5/1974 | Okawa et al. | 264/211 |
| 4,394,474 | 7/1983 | McKinney et al. | 264/211 X |
| 4,448,739 | 5/1984 | Baus | 264/132 |
| 4,540,538 | 9/1985 | Corwin et al. | 264/211 |
| 4,636,340 | 1/1987 | Itaba et al. | 264/211 |
| 4,837,075 | 6/1989 | Dudley | 428/220 |
| 4,883,697 | 11/1989 | Dornbusch et al. | 428/35.7 |
| 4,904,324 | 2/1990 | Heider | 264/509 X |
| 4,909,723 | 3/1990 | Slat et al. | 425/126.1 X |
| 5,019,314 | 5/1991 | Burlando | 264/157 X |

OTHER PUBLICATIONS

Internal search abstracts related to Tonen Petrochemicals (JAPAN), pp. 1-3, 1988-1991.
Plastiscope, *Modern Plastics*, Feb. 1989, p. 22.
Kimdura Synthetic Paper, Production Buyers Guide, Kimberly-Clark, undated.
Polyart, Why Polyart is becoming a legend in the field, etc., undated.
Polyart, Performance, Statistics, Versatility, undated.

*Primary Examiner*—Richard L. Chiesa

[57] ABSTRACT

Extrudable labelstock for in-mold labeling purposes which has a tensile ultimate elongation per ASTM D-882 of at least about 10% in one or both of the machine and transverse directions, and which contains a sufficient amount of one or more slip additives to prevent a significant degree of edge-welding between adjacent stacked sheets of the labelstock on a high type die cutter in an in-mold labeling process, and the improved in-mold labeling process employing such labelstock.

10 Claims, 1 Drawing Sheet

IN-MOLD LABELING METHOD

CROSS-REFERENCE TO RELATED APPLICATION

This is a continuation of application Ser. No. 07/485,333 filed Feb. 29, 1990 now abandoned.

BACKGROUND OF THE INVENTION

1. Field of the Invention

The present invention relates to film labelstock, and particularly to extrudable film labelstock for in-mold labeling purposes, wherein good die-cuttability, printability, and/or contact clarity are desirable.

2. Brief Description of the Prior Art

The conversion of labelstock into labels for in-mold labeling involves the printing, sheeting, stacking, and die-cutting of the labelstock on a high type die cutter. A number of commercially desirable filmstocks exhibit an economically significant degree of edge welding between adjacent stacked sheets of film in die-cutting on such apparatus, however, such that individual labels cannot be properly formed and dispensed in the in-mold labeling process.

Consequently, polyethylene and a number of related highly extensible, inexpensive film materials have not heretofore proven to be economically useful alternatives for in-mold labeling, unless modified in some fashion so that the filmstock to be die-cut possesses a tensile ultimate elongation in both the machine and tensile directions, as determined by ASTM D-882, on the order of about 50% or less. It is noted that in fact some labelstocks, notably some polystyrene labelstocks, have die cut acceptably at the label thicknesses typically employed (i.e., 3-4 mils) in the in-mold labeling industry even with tensile ultimate elongations of from 45-50%, but for labelstocks generally it is considered that the lower figures represent an acceptable degree of extensibility at these typical thicknesses and in the commercial in-mold labeling processes.

Usually the films displaying a tensile ultimate elongation of this magnitude, i.e., the films which have to date proven sufficiently resistant to edge-welding to be of practical use in an in-mold labeling process of the type described, are either very highly biaxially oriented, or are highly filled with inorganic fillers, or possess a voided structure. Achieving a high degree of biaxial orientation requires comparatively expensive machinery relative to conventional blown and cast film apparatus. Highly filled filmstocks and those with a voided structure generally have a roughened surface which is not amenable to printing and exhibit poor contact clarity.

Recently-issued U.S. Pat. No. 4,883,697 (the '697 patent) to Dornbusch et. al. discloses a label for in-mold labeling wherein a thermoplastic label stratum is joined by coextrusion or preferably by an intervening adhesive layer to a stress-compensating stratum. The stress-compensating stratum is coated with a low temperature sealant layer such a the ethylene-vinyl acetate copolymer-paraffin-microcrystalline wax mixture described in U.S. Pat. No. 3,753,125 to Elliott. The thermoplastic label stratum can be polypropylene or other materials having a Young's modulus of greater than 100,000 psi, while the stress-accommodating stratum can be formed from materials such as low density polyethylene or ethylene-vinyl acetate copolymers having a Young's modulus of less than 40,000 psi.

Recently-issued and commonly-assigned U.S. Pat. No. 4,387,075 to Dudley discloses a coextruded label for use in in-mold labeling also, but relies on a surface printable layer of polystyrene.

While it is considered that films of the type described in the U.S. Pat. No. 4,883,697 would possible die cut acceptably and without a significant degree of edge welding, the patent does not teach or suggest an acceptable, wholly extrudable film labelstock which utilizes the edge-welding but inexpensive materials such as high density polyethylene, and which further presents a smooth surface for printing and excellent contact clarity.

Such a labelstock would be desirable from the perspective of enabling the economical use in an in-mold labeling process of materials which, despite their attractiveness as relatively inexpensive and effective label materials, previously have not been generally so used because of edge-welding between stacked sheets of the materials in die-cutting on a high type die cutter. The labelstock would further prove advantageous in being wholly extrudable rather than requiring an additional coating step, and by conventional blown and cast film processes and equipment. The absence of fillers in the labelstock such as would create a rough surface for printing or cause poor contact clarity in the labels would be a further desirable aspect.

SUMMARY OF THE INVENTION

The present invention provides a film labelstock which meets these needs and which overcomes the shortcomings of the prior art relating to labelstock particularly for in-mold labeling.

In one aspect, the present invention relates to an extrudable film labelstock characterized by a tensile ultimate elongation in one or both of the machine and transverse directions of at least about 10% according to ASTM D-882, and having a sufficient amount of one or more slip additives incorporated therein such that stacked sheets of the labelstock will die cut on a high type die cutter without a significant degree of edge-welding between the sheets.

In another aspect, the invention relates to a label manufactured from the labelstocks of the present invention and to an article to which the label is applied, and more particularly relates to labels wherein an inner surface of a surface printable layer carries printed matter rather than an exposed outer surface of the label. "Inner" and "outer" in this respect are thus understood as being determined relative to an article to which the label is applied, and to the opportunity for the environment in which the label is used to act upon the printed matter.

In still another aspect, the invention provides processes or inhibiting edge welding in the die cutting generally of extrudable film materials characterized by a tensile ultimate elongation in one or both of the machine and transverse directions of at least about 10% according to ASTM D-882, and particularly in the die-cutting of film labelstocks so characterized for in-mold labeling. Also provided is an improved in-mold labeling process of the type comprising the steps of forming a film labelstock by extrusion, printing on a surface printable layer of the film labelstock, forming the printed film labelstock into sheets, stacking the sheets, die cutting the stacked sheets to form labels therefrom, and dispensing the die cut labels to one or more molds for application to an article to be labeled, wherein the improvement comprises the step of incorporating a sufficient amount of one or more slip additives in the film labelstock such that the stacked sheets of the labelstock will die cut on a high type die cutter without a significant degree of edge-welding between the sheets.

DETAILED DESCRIPTION OF THE PREFERRED EMBODIMENTS

Figure 1:
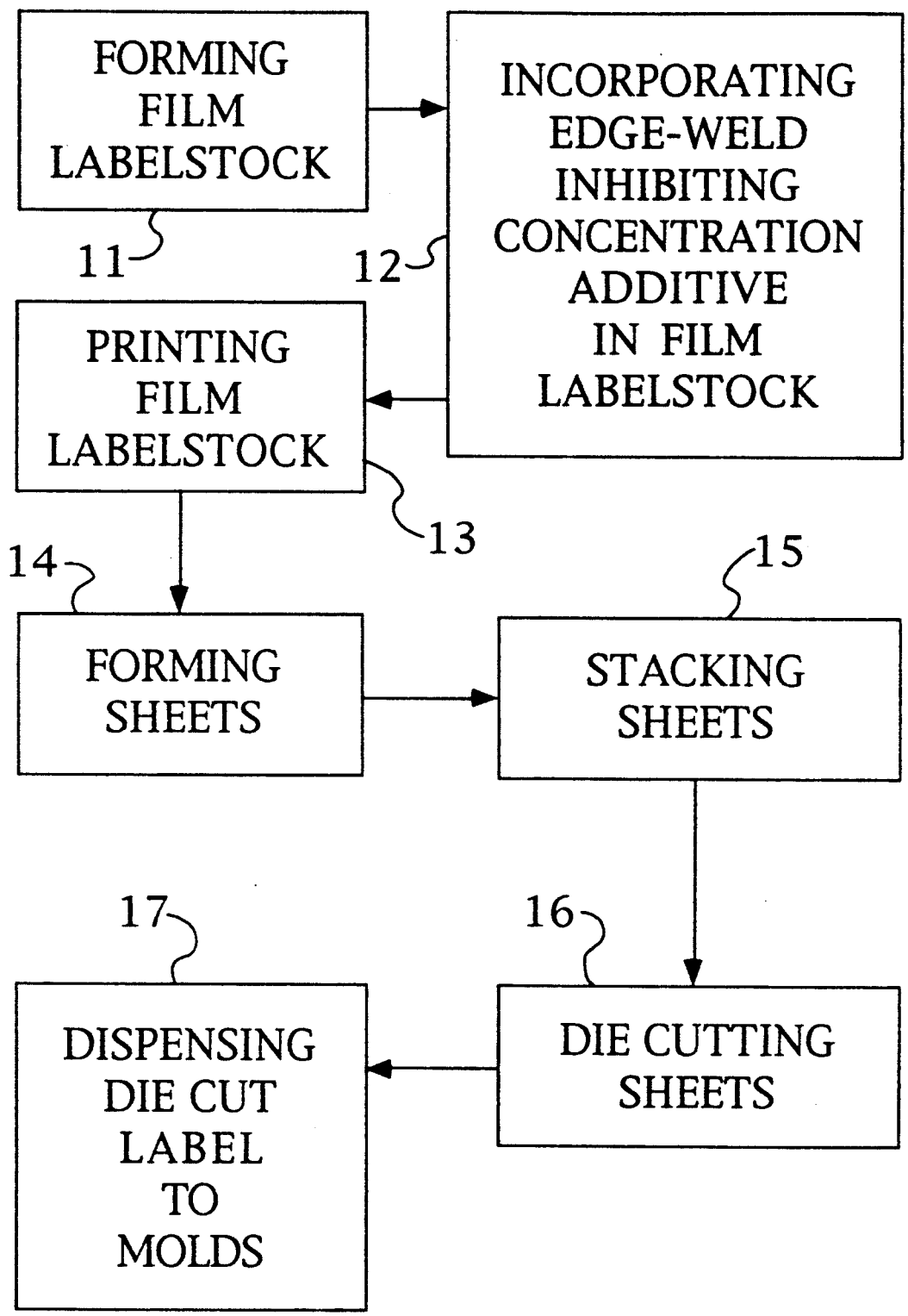
FIG. 1 is a schematic flow diagram of the process of the present invention.

The extrudable film labelstock of the present invention is capable of being manufactured in a wide variety of embodiments and with a variety of materials, as will be readily appreciated. For purposes of the present disclosure, however, several embodiments are favored.

In a comparatively simple embodiment, the film labelstock will consist essentially of a surface printable layer, with the surface printable layer having the one or more slip additives incorporated therein in an amount sufficient to permit the labelstock to be die cut on a high ye die cutter without a significant degree of edge-welding between stacked sheets of the labelstock.

Some degree of edge-welding is thus considered permissible. What is essentially expressed in the term "without a significant degree of edge-welding" is the idea that the labelstock of the present invention should not possess the extent of edge-welding which has heretofore made the use of film materials having a tensile ultimate elongation (per ASTM D-882) of at least a certain percentage and greater economically and practically infeasible.

Preferably, however, the film labelstock of the present invention should realize at least a twenty-fold reduction in edge-welding over that experienced with a labelstock identically constructed and processed but for the omission of the one or more slip additives therefrom. Most preferably, the film labelstock with slip additives incorporated therein according to the instant invention should realize at least a thousand-fold improvement in edge-welding over a labelstock omitting these slip additives.

The degree of edge-welding for purposes of this comparison is defined by the percentage of edge-welded sheets of a given 3.5 to 5.0 mil thick, unprinted labelstock when cut on a high type die cutter.

In addition to the aforementioned slip additives, the surface printable layer will preferably also be comprised of a thermoplastic materials fraction selected from the group consisting of homopolymers of the olefins, copolymers of two or more of the olefins, and mixtures of such homopolymers and/or copolymers. Thus, for example, the surface printable layer may comprise in addition to the one or more slip additives a mixture of low density polyethylene and polypropylene, or a mixture of an ethylene copolymer with polypropylene homopolymer, or a mixture of one ethylene copolymer with a different ethylene copolymer, so long as the surface printable layer retains a tensile ultimate elongation of at least about 10% in one or both of the machine and transverse direction, as determined by ASTM D-882.

For a thermoplastic materials fraction constituted as described in the preceding paragraph, it is considered that slip additives selected from the group consisting of stearamide, erucylamide, oleyl palmitamide, and stearyl stearamide, especially from about 0.15 to about 1.0 percent by weight of such slip additives (based on the weight of the surface printable layer), will be useful for achieving an edge-weld inhibiting concentration of slip additives at the interface between adjacent sheets of stacked 3.5–5.0 mil thick, unprinted labelstock and thus acceptable levels of die-cuttability on a high type die cutter, without at the same time rendering the surface of the labelstock unsuitable for printing.

The thermoplastic materials fraction of the surface printable layer and thus of the film labelstock is more preferably comprised of low density polyethylene, medium density polyethylene, high density polyethylene, or mixtures thereof. Where the thermoplastic materials fraction is at least about 25 percent by weight, and most preferably about 100 percent by weight of high density polyethylene, it is expected that the twenty-fold improvement in edge-welding alluded to earlier will be possible with the incorporation of at least about 0.25 percent by weight of slip additives during extrusion of the surface printable layer. It is further expected that the most preferred thousand-fold improvement will be possible with the addition of at least about 0.50 percent by weight of the slip additives, which slip additives again are selected from the group consisting of stearamide, erucylamide, oleyl palmitamide, and stearyl stearamide.

The surface printable layer in this most preferred embodiment can also contain from about 0 to about 20 percent by weight of a pigment such as titanium dioxide.

In sum, the simple embodiment wherein the film labelstock consists essentially of a surface printable layer would, in a most preferred embodiment, contain: at least about 0.5 percent but not more than 1.0 percent by total weight of slip additives selected from the group consisting of stearamide, erucylamide, oleyl palmitamide, and stearyl stearamide; a thermoplastic materials fraction of at least about 25 percent and preferably about 100 percent by weight of high density polyethylene; and from about 0 to about 20 percent by total weight of titanium dioxide.

In another embodiment of the film labelstock of the present invention, the film labelstock would again be characterized by a tensile ultimate elongation in one or both of the machine or transverse directions of at least about 10%, but would comprise a surface printable layer of a first film material and a supporting layer of a second material. The surface printable layer and the supporting layer in this embodiment define first and second outer surfaces, respectively, of the film labelstock, such that when the film labelstock of this embodiment is sheeted and stacked the surface printable layer of a first sheet will be placed in intimate contact with the supporting layer of a second sheet of labelstock.

The surface printable layer and the supporting layer collectively contain a sufficient amount of one or more slip additives in the first and second materials comprising such layers so that edge-welding to a significant degree is effectively prevented between adjacent stacked sheets of labelstock. Generally the one or more slip additives will be present in a combined amount of from about 0.15 to about 1.0 percent by weight of the combined weights of the surface printable layer and the supporting layer.

Preferably the surface printable layer is otherwise constituted in this embodiment substantially as described in the simpler embodiment detailed above, with the first material thus comprising a thermoplastic materials fraction which is most preferably from at least about 25 percent to about 100 percent by weight of high density polyethylene, and containing from about 0 to about 20 percent by weight of the layer of a pigment such as titanium dioxide.

The supporting layer in a preferred embodiment is a heat activatable adhesive substrate layer substantially of the type described in detail in commonly-assigned U.S. Pat. No. 4,837,075 to Dudley, which patent is hereby incorporated herein by reference. Briefly, however, the second film material in this preferred embodiment of the supporting layer comprises a polymeric fraction selected from the group consisting of: (a) homopolymers of ethylene; (b) copolymers of ethylene with one or more alpha olefins having from 4 to 8 carbons; (c) mixtures of (a) and (b); and (d) mixtures of either (a), (b), or (c) with up to about 95 percent by weight of one or more copolymers of ethylene and from about 1 percent to about 30 percent by weight of a copolymerizable ethyleneically unsaturated carboxylic acid or ester containing comonomer. Most preferably, the heat activatable adhesive substrate layer will be comprised of a mixture falling into the (d) group of mixtures, wherein the mixture will contain more than about 35 percent by weight of one or more ethylene-vinyl acetate copolymers.

The most preferred embodiment of the at least two layer construction of the film labelstock of the present invention, in other words of the embodiment having at least a surface printable layer defining a first outer surface of the labelstock and a supporting, heat activatable adhesive substrate layer defining a second opposing outer surface of the labelstock, would have a surface printable layer consisting essentially of at least about 25 percent, and preferably about 100 percent, by weight of high density polyethylene.

The remainder of the surface printable layer would comprise from 0 to about 75 percent by weight of other materials selected from the group consisting of pigments, slip additives selected from stearamide, erucylamide, oleyl palmitamide, and stearyl stearamide, and other ethylene homopolymers and copolymers.

The heat activatable adhesive substrate layer would have a polymeric fraction selected from the categories (a)-(d) of materials enumerated above, and would further contain one or more slip additives in the form of stearamide, erucylamide, oleyl palmitamide, and stearyl stearamide, with the total amount of such slip additives in the surface printable layer and adhesive substrate layer being from about 0.50 to about 1.0 percent by weight of the combined weights of the surface printable layer and adhesive substrate layer.

In general terms, the thicknesses of the respective layers and the amounts and types of slip additives contained in each will be tailored to enhance or at least not cumulatively significantly adversely affect the performance of the labelstock in aspects other than die-cuttability and the prevention of edge-welding, the slip additives again however being generally resent in the surface printable and adhesive substrate layers in an amount of from about 0.15 to about 1.0 percent by weight of the combined weight of these layers.

The embodiments which have been described reflect the discovery that the provision of slip additives in the outer layers of an extrudable film labelstock can, with a proper loading and selection of such additives in outer layers of certain natures, impart a resistance to edge welding in sheets formed from the extruded labelstock when the sheets are die cut on a high type die cutter in an in-mold labeling process. The use of film materials and labelstocks which had previously proven too extensible to be of economically practical value in such processes, such as high density polyethylene film labelstocks, for example, is thus enabled. The specific embodiments detailed above are thought to reflect several useful applications of this discovery wherein contact clarity, surface smoothness, and the amenability of the labelstocks to printing are not significantly compromised.

It will accordingly be understood that numerous other labelstock constructions are within the spirit of the present invention, and are within the design skills of a person of skill in the art to which the present invention most closely pertains. For surface printable layers and supporting or heat activatable adhesive substrate layers comprised of different materials than those specified above but wherein the labelstock may nevertheless still be characterized as too extensible to die-cut on a high type die cutter without added slip additives, it may be found for example that certain slip additives may be more effective in achieving a concentration adjacent a first or second outer surface. In this manner, lesser amounts of the slip additives are necessary to achieve the desired edge-weld inhibiting concentration of slip additives at an interface between the surface printable layer of a first sheet of labelstock and the support layer of an adjacent second stacked sheet.

Or, it may be that certain slip additives are desirably incorporated in a surface printable layer in greater concentrations than the same or other slip additives in the support layer, although typically from considerations of printability the slip additives will be present in the support layer in significantly greater concentrations and may be incorporated substantially exclusively therein if the balance of other properties of interest suggests.

It is also to be understood that the extrudable film labelstocks of the present invention may desirably comprise other extrudable layers in addition to a surface printable layer and a supporting or heat activatable adhesive substrate layer, such as a regrind layer in the manner of U.S. Pat. No. 4,837,075. The film labelstocks of the present invention may thus essentially contain a surface printable layer either alone or in combination with a supporting layer carrying all or some of the slip additives, or may comprise the surface printable layer with a supporting layer and a number of intervening layers wherein slip additives may or may not be distributed, dependent on whether the slip additives are incorporated only in the materials comprising the supporting and surface printable layers or in the materials of the other layers as well. Each of these variations is considered to be within the scope and spirit of the present invention, as defined by the claims which follow closely hereafter.

With reference of FIG. 1, there is shown a schematic flow diagram of one embodiment of the process of the present invention comprising the steps of forming a film labelstock comprising at least a surface printable layer by extrusion, 11; incorporating edgewell inhibiting concentration of one or more additives in the film labelstock such that the stacked sheets of the labelstock will die cut on the high type die cutter without significant degree of edge-welding between the sheets, 12; printing in the surface printable layer of the film labelstock, 13;

forming the printed film labelstock into sheets, 14; stacking the sheets 15; die-cutting the sheets on a high type die cutter 16; and dispensing die-cut labels to one or more molds for application to an article to be labeled, wherein the film labelstock is characterized by an ultimate tensile elongation of at least about 10% in one or both of the machine and transverse directions when measured according to ASTM D-882.

The processes and apparatus by which the materials of the various layers in a film labelstock of the present invention are combined, and by which the labelstock is extruded, sheeted, stacked, and die cut are conventional and well know to the art. The processes and apparatus by which the labels are then dispensed for in-mold labeling to various molds and applied to articles formed in such molds are also well known, and need not be discussed in greater detail herein.

The invention is further illustrated by the following examples:

EXAMPLE 1

In this example a 5.0 mil thick two-layer labelstock was constructed by a cast film coextrusion of a surface printable layer and a heat activatable adhesive substrate layer. The surface printable layer comprised a mixture of about 85.0% by weight of high density polyethylene (with a density in the range of 0.958 to 0.965 grams per cubic centimeter and a melt flow rate of from 4 to 10 grams per 10 minutes per ASTM 1238, condition E), 7.5% by weight of titanium dioxide, and 7.5% by weight of low density polyethylene (density of 0.922 grams per cubic centimeter, and a melt flow rate of 1.15 grams per cubic centimeter, and a melt flow rate of 1.15 grams per 10 minutes per ASTM 1238, condition E). The heat activatable adhesive substrate layer was comprised of: 84.0% by weight of an ethylene-vinyl acetate copolymer having a vinyl acetate content of 23 mol percent and a melt flow rate as determined by ASTM 1238 of 5.5 grams per 10 minutes; 10.0% by weight of a second ethylene-vinyl acetate copolymer having a vinyl acetate content of 28 mol percent and a melt flow rate of 6.0; 4.32% by weight of an ethylene-vinyl acetate copolymer having a vinyl acetate content of about 18 percent and a melt flow rate of about 2.5 grams per 10 minutes; 1.2% by weight of silicon dioxide; and equal amounts at 0.24% by weight each of stearamide and erucylamide. The surface printable layer comprised 85% of the approximately 5.0 mil thickness of the labelstock as extruded, with the other 15% comprising the adhesive substrate layer.

The labelstock as thus constituted was sheeted, stacked and die cut on a high type die cutter. An inspection of a die cut stack of 50 sheets of the labelstock revealed that none of the sheets edge welded to the extent of being incapable of being individually dispensed on the apparatus typically used for this purpose, while an identically constructed and processed labelstock omitting the slip additives showed edge welding between 100% of the stacked sheets.

EXAMPLE 2

In this example an approximately 4.5 mil thick surface printable film layer was constructed by a blown film process. The surface printable film layer was comprised of a mixture of about 71.0% by weight of the low density polyethylene described and used in Example 1, about 24.0% by weight of the high density polyethylene likewise described and used in Example 1, about 1.0% by weight of silicon dioxide, and about 3.6% by weight of the thylene-vinyl acetate copolymer used in Example 1 and having a vinyl acetate content of about 18 mol percent and a melt flow rate of 2.5 grams per 10 minutes. On stacking, sheeting and die cutting in accordance with the treatment of the labelstock of Example 1, none of the 50 stacked sheets showed edge-welding of a significant extent of adjacent sheets. A comparison surface printable film layer which was identically manufactured and processed, and which differed from the first layer only in the omission of the slip additives and its replacement by an equivalent amount by weight of the low density polyethylene, showed edge welding between 90% of the layers.

The above examples demonstrate that the labelstocks of the present invention are significantly less susceptible to edge welding than equivalent labelstocks not containing the slip additives, and further that coextruded labelstocks with surface printable, mostly high density polyethylene layers and heat activatable adhesive substrate layers are capable of being made which do not exhibit a perceptible degree of edge-welding at all.

It can be seen that the present invention is thus well adapted to fulfill the needs and desires set forth therefor above, and while specific embodiments have been described and exemplified herein, it will be understood again that numerous changes of an obvious nature may be made to these embodiments, without departing in spirit and scope from the invention defined by the following claims.

What is claimed is:

1. An in-mold labeling process comprising the steps of:
   (a) extruding a film labelstock having a heat activatable adhesive material, said film labelstock comprising at least a surface printable layer;
   (b) printing on said surface printable layer of the film labelstock;
   (c) forming the printed film labelstock into sheets;
   (d) stacking the sheets;
   (e) die cutting the sheets on a high die cutter;
   (f) dispensing the die cut labels to one or more molds for application to an article to be labeled, wherein the film labelstock has an ultimate tensile elongation of at least about 10% in one or both of the machine and transverse directions when measured according to ASTM D-882; and
   (g) incorporating an edge-weld inhibiting concentration of one or more slip additives in the film labelstock such that the stacked sheets of the label stock will die cut on the high die cutter without a significant degree of edge-welding between the sheets.

2. The invention of claim 1, wherein the sheets of film labelstock comprise at least one surface printable layer defining a first outer surface of the labelstock and a supporting layer defining a second opposing outer surface of the film labelstock, and wherein the supporting layer is the heat activatable adhesive material as a substrate layer.

3. The invention claim 2, wherein the edge-weld inhibiting concentration of additive is from b 0.15 to 1 weight percent based on the combined weights of the surface printable layer and the supporting layer.

4. The invention of claim 2 wherein the supporting layer comprises a polymeric fraction selected from the group consisting of: (a) homopolymers of ethylene; (b) copolymers of ethylene with one or more alpha olefins having from 4 to 8 carbons; (c) mixtures of (a) and (b);

and (d) mixtures of either (a), (b), or (c) with up to 95 percent by weight of one or more copolymers of ethylene and from about 1 percent to about 30 percent by weight of a copolymerizable ethyleneically unsaturated carboxylic acid or ester containing comonomer.

5. The invention of claim 2 including stacking the sheets of film labelstock such that the surface printable layer of a first sheet and the supporting layer of a second sheets are placed in intimate contact.

6. The invention of claim 5 including incorporating the one or more slip additives in at least one of the surface printable layers and the supporting layer in an amount sufficient to achieve at least an edge-weld inhibiting concentration of said one or more slip additives at a first outer surface of a first sheet and a second opposing outer surface of a second sheet.

7. The invention of claim 6, wherein the one or more slip additives are incorporated in the supporting layer at a significantly greater concentration than in the surface printable layer.

8. The invention of claim 7, wherein the one or more slip additives are incorporated substantially exclusively in the supporting layer.

9. The invention of claim 1 wherein the surface printable layer comprises low density polyethylene or polypropylene, medium density polyethylene or polypropylene, high density polyethylene or polypropylene, or mixtures thereof.

10. The invention of claim 1, wherein the surface printable layer contains the heat activatable adhesive material incorporated therein.

* * * * *